United States Patent [19]
Yu et al.

[11] Patent Number: 5,537,596
[45] Date of Patent: Jul. 16, 1996

[54] METHOD AND APPARATUS FOR OVERRIDING RESOURCE MAPS IN A COMPUTER SYSTEM

[75] Inventors: Dean T. Yu, Cupertino; Christopher S. Derossi, San Jose, both of Calif.

[73] Assignee: Apple Computer, Inc., Cupertino, Calif.

[21] Appl. No.: 425,251

[22] Filed: Apr. 17, 1995

Related U.S. Application Data

[63] Continuation of Ser. No. 19,600, Feb. 19, 1993.

[51] Int. Cl.$^6$ ..................................................... G06F 9/06
[52] U.S. Cl. .................. 395/700; 364/251.5; 364/254.2; 364/222.8; 364/DIG. 1
[58] Field of Search ........................... 395/700; 364/300, 364/200, DIG. 1

[56] References Cited

U.S. PATENT DOCUMENTS

| | | | |
|---|---|---|---|
| 4,604,690 | 8/1986 | Crabtree et al. | 364/200 |
| 4,623,963 | 11/1986 | Phillips | 364/200 |
| 5,210,875 | 5/1993 | Bealkowski et al. | 395/700 |
| 5,247,683 | 9/1993 | Holmes et al. | 395/700 |
| 5,257,368 | 10/1993 | Benson et al. | 395/600 |
| 5,257,387 | 10/1993 | Richek et al. | 395/800 |
| 5,261,080 | 11/1993 | Khoyi et al. | 395/500 |
| 5,311,424 | 5/1994 | Mukherjee et al. | 364/401 |
| 5,325,532 | 6/1994 | Crossmy et al. | 395/700 |
| 5,327,553 | 7/1994 | Jewett et al. | 395/575 |
| 5,355,489 | 10/1994 | Bealkowski et al. | 395/700 |

Primary Examiner—Alvin E. Oberley
Assistant Examiner—Majid A. Banankhah
Attorney, Agent, or Firm—Carr, DeFilippo & Ferrell

[57] ABSTRACT

An improved method and apparatus for defining resources in a computer system is presented whereby resource maps in a computer system can be selectively updated by adding resources and superseding resources in an existing resource map by providing a new resource map which overrides the prior resource map.

12 Claims, 6 Drawing Sheets

METHOD AND APPARATUS FOR OVERRIDING RESOURCE MAPS IN A COMPUTER SYSTEM

RELATED APPLICATIONS

This is a continuation of co-pending application Ser. No. 08/019,600 filed on Feb. 19, 1993.

CROSS REFERENCE TO RELATED PATENT APPLICATION

This patent application is related to U.S. application Ser. No. 08/019,599, filed concurrently herewith, for a "A Method for Updating Computer Operating Systems to Control Later-Released Hardware Systems" by Chris Derossi and Dean Yu, which is hereby incorporated by reference.

Documents Incorporated by Reference

The following documents are herein incorporated by reference: *Inside the Macintosh*, Volume IV, Addison-Wesley Publishing Company, Inc. (1987); and *Apple Macintosh Family Hardware Reference*, Addison-Wesley Publishing Company, Inc. (1988).

BACKGROUND OF THE INVENTION

1. Field of the Invention

The present invention relates generally to the allocation of resources in a computer operating system and particularly to an apparatus and method for overriding the resources allocated by the original operating system by providing a new resource map which takes precedence over the older resource map.

2. Summary of the Related Technology

In the past, operating systems were developed with a particular processor and hardware environment in mind. System designers enthusiastically tailored the operating system to take advantage of the underlying hardware. Unfortunately, these highly tailored operating systems were not portable. They fit the underlying processor so well that they would not run on another processor. This made the operating system inflexible. Thus, a new version of the operating system had to be coded and released for every new processor or hardware configuration change implemented.

In the past, computer designers, including third parties and original equipment manufacturers, were able to extend the functionality of an operating system software release by patching or implementing new functions. These functionally extensible patch files were sometimes referred to as "extensions." For example, to add a new functionality that allows an application program to play movies within a document, the system software would be functionality extended with an extension file. Extensions may also be referred to as "INIT" files because of their file type in the Macintosh computer environment provided by Apple Computer, Inc. Extension files were merely patch files that relied on the system boot routine to bring up the system from a power on reset state to a fully operational state.

Sometimes, it did not take long for the latest version of an operating system to be upstaged by a newer version generated to accommodate a new hardware configuration. Different versions of the same operating systems proliferated. While it is considered good programming design methodology to take advantage of the underlying hardware architecture, the underlying hardware architecture has in some instances created artificial limitations in the minds of the systems programmers. Typically, past operating systems that were designed to run on a particular hardware platform were incompatible with a different hardware platform, even though the two hardware platforms were very similar. Oftentimes the operating system designed to run on a first hardware platform would be prevented from loading onto a second slightly different platform because of a simple status check performed by the operating system during the boot procedure or system startup that prevented the software from loading. Thus, in order to change the operating system to accommodate the hardware environment, system designers had to release a new version of the operating system to accommodate the second hardware platform.

Frequently there were changes in hardware that required changes to the system software. In many cases, the changes were minor compared to the task of developing and releasing an entirely new version of the operating system software. Typically, in the past an entirely new version of the operating system software had to be developed for each set of machines. Each new set of machines thus required an individual development effort. These ad hoc efforts at system design negatively impacted engineering resources, quality control, marketing, and became somewhat of a nightmare for those attending to version control and documentation.

Moreover, customers are confused when numerous ad hoc versions of system software appear on the market with higher version numbers than the one they just bought. Customers often perceived a higher numbered version to be superior over a lower, numbered version, even though the difference in versions was only to accommodate hardware which the customer did not utilize. This contributed to customer dissatisfaction in some instances.

In addition, application programs that were written to run on a particular hardware platform may not be compatible with later versions of the hardware, because the hardware on the later version may not be identical to the particular hardware platform on which the application program was designed to run.

In the past, new functionality was typically added to operating systems with patch files. Patch files contained changes to system software that were called in and executed to augment system software after system initialization by the boot routine. These patch files would change code in the operating system to accommodate new machines, new hardware configurations, and to update system software in order to fix problems or add functionality after the release of a particular version of an operating system.

The named inventors herein have developed a new operating system architecture designed to solve these problems. Recent developments in computer operating systems architecture have moved portions of the boot or startup routine out of read only memory (ROM) and into resource files so that the boot routine is no longer hard coded and inflexible. Such an operating system is described in an application filed concurrently herewith, for a "A Method for Updating Computer Operating Systems to Control Later-Released Hardware Systems" by Chris Derossi and Dean Yu assignee. The details of that Computer Operating System Enabler are disclosed in that application, which is incorporated herein by reference, and therefore will not be repeated here. These new computer operating system architectures add a new dimension of flexibility to software upgrades. Thus there is a need for a new method and apparatus for resource allocation which is adaptable along with the new operating systems.

SUMMARY OF THE INVENTION

The present invention provides a method and apparatus to override a resource map utilized by an operating system. A method and apparatus is disclosed which enables a resource manager to override any resource map by reading in a new resource map from the override resource map. The resource manager then moves the new resource map in the resource chain above the overridden resource map. The resource manager then relies on the new resource map's position in the resource chain to facilitate some of its later operations. The resource map may exist on a network and contain network resources.

These features of the invention, as well as other features will become apparent upon considering the following description, drawings and claims.

DETAILED DESCRIPTION OF THE PREFERRED EMBODIMENT

Figure 1:
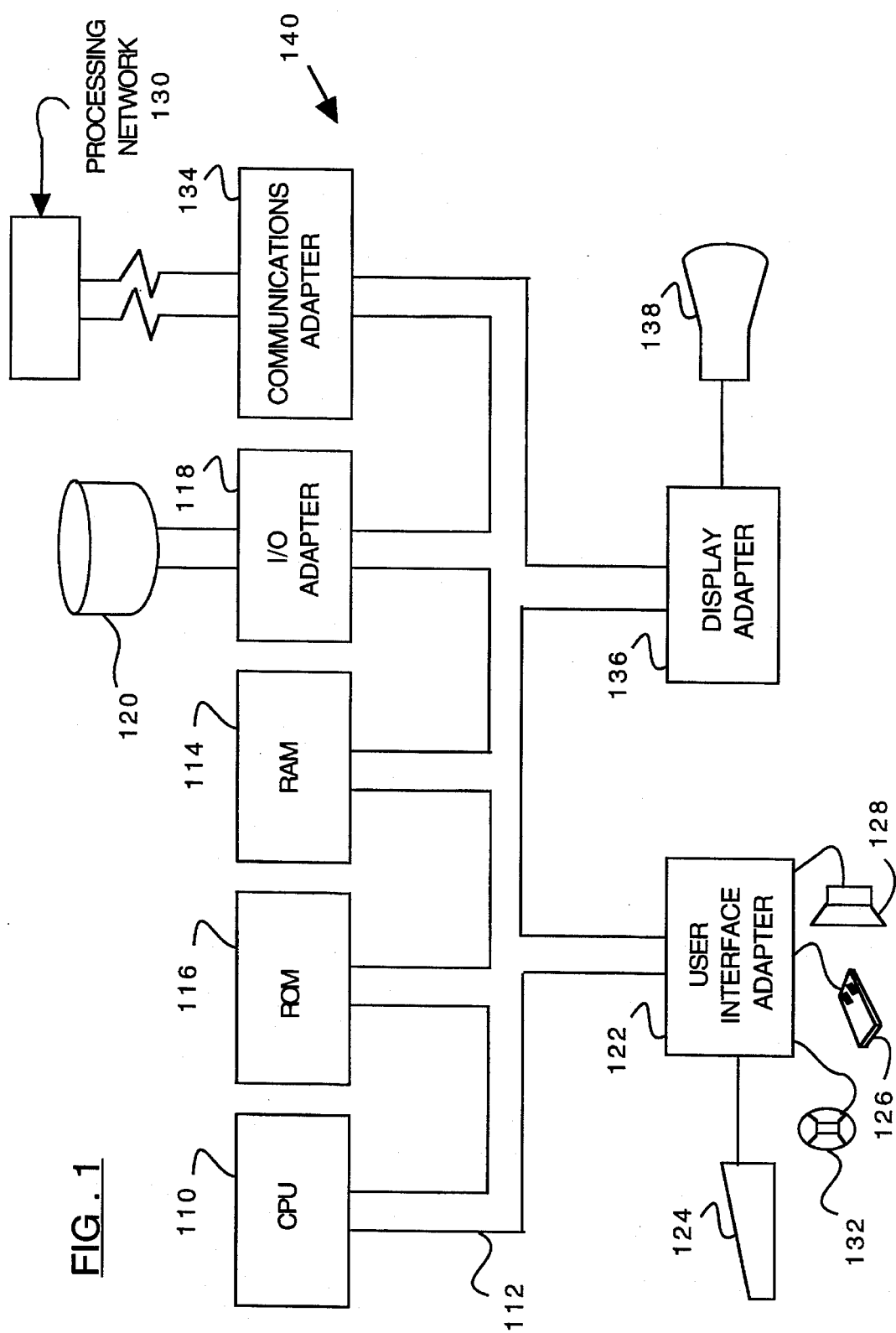
FIG. 1 is a block diagram illustrating the preferred hardware embodiment in accordance with the present invention.

The invention will be clarified by consideration of the following examples which are intended to be exemplary of the invention and the use of the invention, and are not intended to be a limitation on the scope of the invention.

A new operating system is now provided which is configurable by installing new system files, referred to as "system enablers", which are called by the operating system boot routine. The new computer operating system enabler is described in U.S. patent application Ser. No. 08/019,599, filed concurrently herewith, for a "A Method for Updating Computer Operating Systems to Control Later-Released Hardware Systems", and assigned to Apple Computer, Inc. This new computer operating system enabler is referred to as a CPU Gibbly.

Resource override behavior is provided by the operating system software in the present invention. In the preferred embodiment, the method and apparatus of the present invention provides resource override behavior existing as a new functionality in the resource manager. Thus, in the preferred embodiment of the method and apparatus of the present invention, the resource manager has been extended through four new functionalities or behaviors: the Map Override behavior, the Ignore Duplicates behavior, the Two Deep behavior, and the Protect From Close behavior. In the preferred embodiment, these new behaviors are implemented as patches in the Apple operating system "System 7.1", and are transparent to existing application code. Each of these behaviors, the concept behind each behavior, and how these behaviors function in the preferred embodiment are described below.

In the preferred embodiment, resource files contain a resource map. Preferably, when the file is opened, the resource manager reads in the resource map for the file. The resource map is like a directory that tells the resource manager what resources are in a particular file. Because there are also resources in ROM, an additional resource map is provided as a directory of the resources in ROM. Resources, for example, comprise drivers for printers or disks. The resource manager maintains a handle or indirect address to each of these resource maps.

In the preferred embodiment, each resource map contains an attribute area. This attribute area is preferably bit-mapped and utilized to select or describe the override behaviors. Preferably one bit in the attribute byte indicates whether or not the resource map should be treated as a continuation of the map before it. Bits may be set to serve as indications of attributes. Attributes may also be implemented as bits or bytes set in memory, bits or bytes set in hardware registers, messages sent to relevant processes, vectors generated after changing the vector address to point to new maps or data, or some other means for indication to the system or the user. Resources existing in resource maps may be selectively overridden. Thus resource maps may be partially or completely overridden.

The Map Override Behavior

In the preferred embodiment, resources contained in a resource map that exhibits the Map Override behavior will override resources identical resource in a subsequent map located in a lower position in the computer system's resource chain. Preferably, this behavior supports the new Gibbly computer operating system enabler mechanism which obviates the need for multiple versions of an operating system in order to accommodate new hardware releases for new CPUs.

In the preferred embodiment, a computer operating system enabler, or Gibbly contains patch code that enables a computer system to boot and recognize new functionality. In the preferred embodiment, Gibblies may also contain additional resources that supersede or replace equivalent resources in the base System file. Thus, when an application requests a resource from the System file, the active Gibbly's resource map is searched for the resource first. If the resource is found in the Gibbly, a handle to that resource is returned.

If the requested resources are not found in the Gibbly, the System file is searched for an occurrence of the resource as normally would occur if no system enabler were present.

In the preferred embodiment, in the original shipment of a computer system, the system resource file contains an 'STR#'-16395 resource which includes the names of all computers which were then currently being shipped. Preferably, when the vendor ships a later release of the operating system software, it also contains an 'STR#'-16395 resource with the names of all currently shipped computers which will include those new products that were added since the original shipment. Preferably, a new Gibbly file will be distributed to all users which will contain an 'STR#'-16395 resource containing all the currently shipping computers which may be different than the original list of products currently being shipped. Thus the system resource map is updated without changing the old system software.

In the preferred embodiment, setting the kOverrideNextMapBit in the new System Enabler's resource map ensures that the 'STR#'-16395 resource list in the latest System Enabler is returned. Thus, in the preferred embodiment, both new and old computer systems have the same version of the computer operating system, each with a new computer system enabler with a new list of products currently being shipped. In the preferred embodiment, this map override behavior is not limited to the system resource file. Preferably, any resource map may be overridden.

In the preferred embodiment, override resources in an override map exactly match the type, identification number, and name of the resource it is meant to override. Preferably, this ensures that all Resource Manager calls return a handle to the same resource. For example, in the preferred embodiment, the Resource Manager routine "GetResource"

searches for resources by type and identification number. Preferably, the routine GetNamedResource searches for resources by type and name. In the preferred embodiment, if a named resource in a resource map is overridden by a resource without a name, GetResource will return a handle to the resource in the override map, but GetNamedResource will return a handle to the original resource.

In the preferred embodiment, there may be a plurality of override maps for a given resource map. Preferably, the most recent override map is higher in the resource chain than previous override maps which are already in place in the resource chain. In the preferred embodiment, a resource may be overridden multiple times. Preferably, the resource located in the most recent override resource map is returned by the Resource Manager.

In the preferred embodiment, an override map remains open for the duration of a computing session. Preferably, an override map resides in the portion of memory allocated to the system software. In the preferred embodiment, this area of memory is referred to as the system heap. The system heap is that portion of memory allocated to the system software by the memory management system. Preferably, the system heap is protected from inadvertent overwriting by an application program. In the preferred embodiment, the system heap, unlike portions of memory allocated to application programs, is not reinitialized when an application restarts. The system heap is that portion of memory utilized by the system software to allocate memory for data and resources. Thus, the integrity of the resource override map in the system heap is maintained when the application heap is reinitialized.

When an application is launched or started up, the operating system dynamically allocates a partition in memory referred to as an application partition. This partition contains required segments of the application's code as well as other data associated with the application. The application partition is divided into three major parts: the application stack, the application heap, and the application global variables. The application stack is an area of memory in the allocated application memory partition that can grow or shrink at one end while the other end remains fixed. The application heap is the area of memory in the application partition in which space is dynamically allocated and released on demand. The heap contains virtually all items that are not allocated on the stack. The application heap contains the application's code segments and resources that are currently loaded into memory.

In the preferred embodiment, the boot code or system startup procedure opens the system enabler and resource map in the application heap. Preferably a resource map can be converted into an override resource map and copied into the system heap.

The Two Deep Behavior

In the preferred embodiment of the present invention the resource manager deals with structured data on disk. Applications call the resource manager to fetch structured data, for example, a description of a menu or a description of a window. These descriptions are stored as resources. Applications may call the resource manager to request these resources by specifying either a one-deep call or a unlimited depth N-deep search call for the requested resource.

When an application invokes the resource manager to request a resource with an N-deep call, the resource manager first searches the current resource maps for the requested resource. In the preferred embodiment, a plurality of resource maps are linked together in a linked list of resources to form a "resource chain." In an N-deep invocation of the resource manager, if the resource manager does not find the requested resource in the current resource map, it will look for the requested resource in the next resource map in the resource chain. Thus, when performing an N-deep search, the resource manager will continue to look for the requested resource until it finds the resource or encounters the end of the resource chain. If an application invokes the resource manager with a onedeep call, however, the resource manager will search only the current resource map and quit if it does not find the requested resource, rather than traversing the entire resource chain as it would in an N-deep invocation.

In the preferred embodiment, the Two Deep behavior treats a sequence of resource maps as one resource map for a "one-deep" Resource Manager call. Preferably, if a resource is not found in the current resource map during a "one-deep" resource call, and the kTwoDeepBit is set in the current resource map's attributes, then the next resource map is also searched. In the preferred embodiment, this process is repeated until the resource is found or a map that does not have the kTwoDeepBit set is searched.

For example, because fonts were usually kept in the system file, it is preferable to make sure that applications which call one-deep routines will be able to find resources that have been added or are not located in the system file. Thus, in the preferred embodiment a two-deep call enables a user to command the resource manager to continue looking for the requested resource until it finds it, or encounters a resource map that indicates that it should not be treated as a continuation of the resource map before it in the resource chain. Thus, the two deep attribute will make a resource map look like it is part of the resource map immediately before it in the resource chain.

Referring now to the drawings, the details of the preferred embodiment are schematically illustrated. In FIG. 1 the number 140 designates generally a computer system. A representative hardware environment for the present invention is depicted in FIG. 1, which illustrates a suitable hardware configuration of a computer system 140 in accordance with the present invention.

The computer system 140 has a central processing unit 110, such as a conventional microprocessor, and a number of other devices interconnected via a computer system bus 112. The computer system 140 comprises a random access memory 114 (RAM), a read only memory 116 (ROM), an I/O adapter 118 for connecting peripheral devices such as nonvolatile memory devices such as disk unit 120 to the bus 112, a user interface adapter 122 for connecting a keyboard 124, a mouse 126, a speaker 128, a microphone 132, and/or other user interface devices (not illustrated) to the bus 112. The computer system 140 may also have a communications adapter 134 for connecting the bus 112 to a data processing network 130 and a display adapter 136 for converting the display information from the bus 112 to video information to drive a display device 138.

Figure 2:
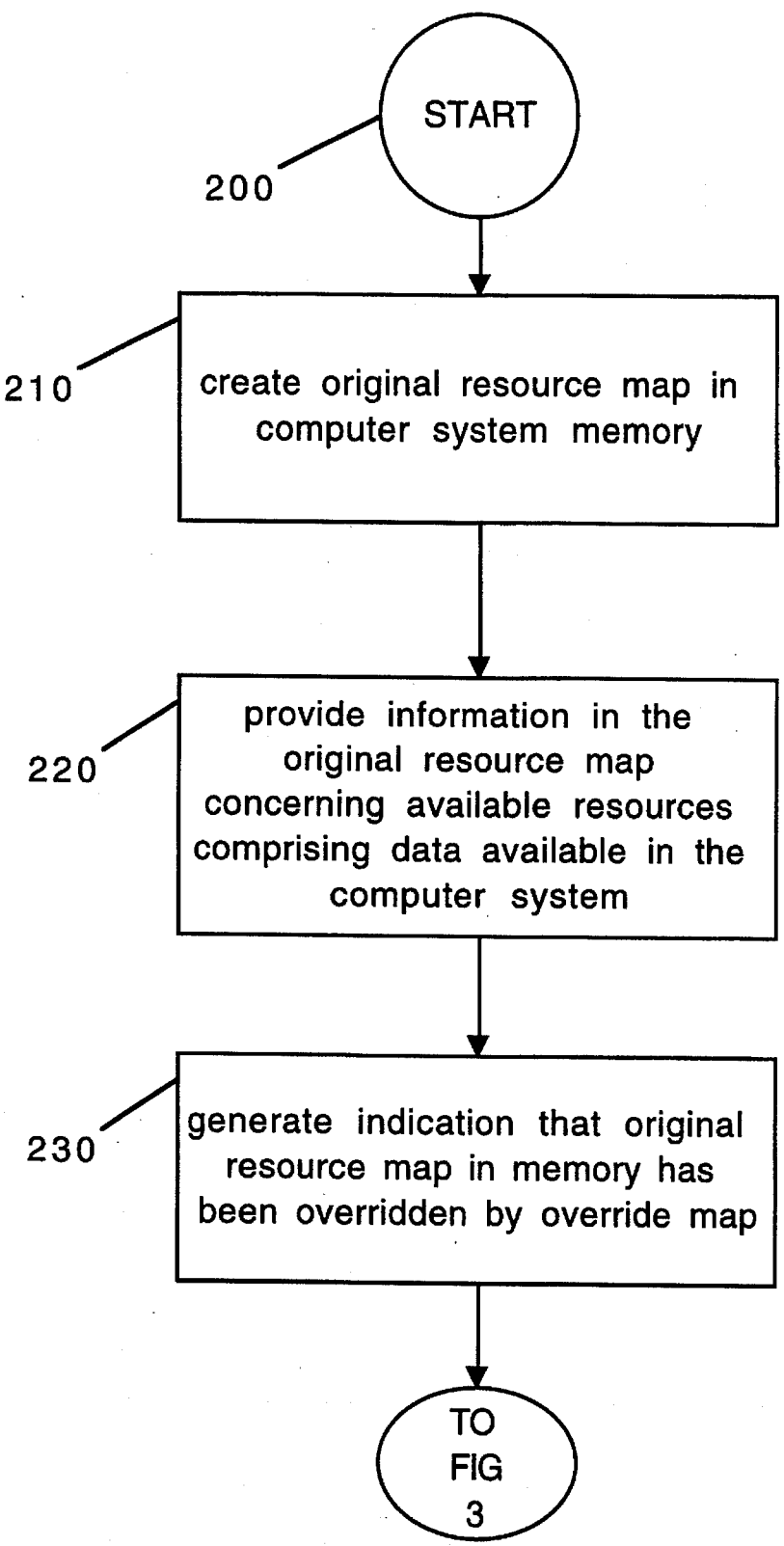
FIGS. 2–6 illustrate a preferred sequence of operations performed in accordance with the present embodiment.

Referring now to FIG. 2, the preferred sequence of functions implemented in accordance with the present invention is shown. The preferred sequence of functional execution begins at start 200. The first function implemented in the preferred sequence is to create a first resource map 210. The next function implemented is to provide information in the first resource map concerning resources available 220. Resources available comprise software available to the computer system. In an alternative embodiment the computer system comprises a plurality of interconnected processors with memory. In the alternative embodiment, resources or resource maps may be shared by interconnected processors.

The next function executed in the preferred embodiment is generation of an indication that the second resource map in memory has been overridden 230.

Figure 3:
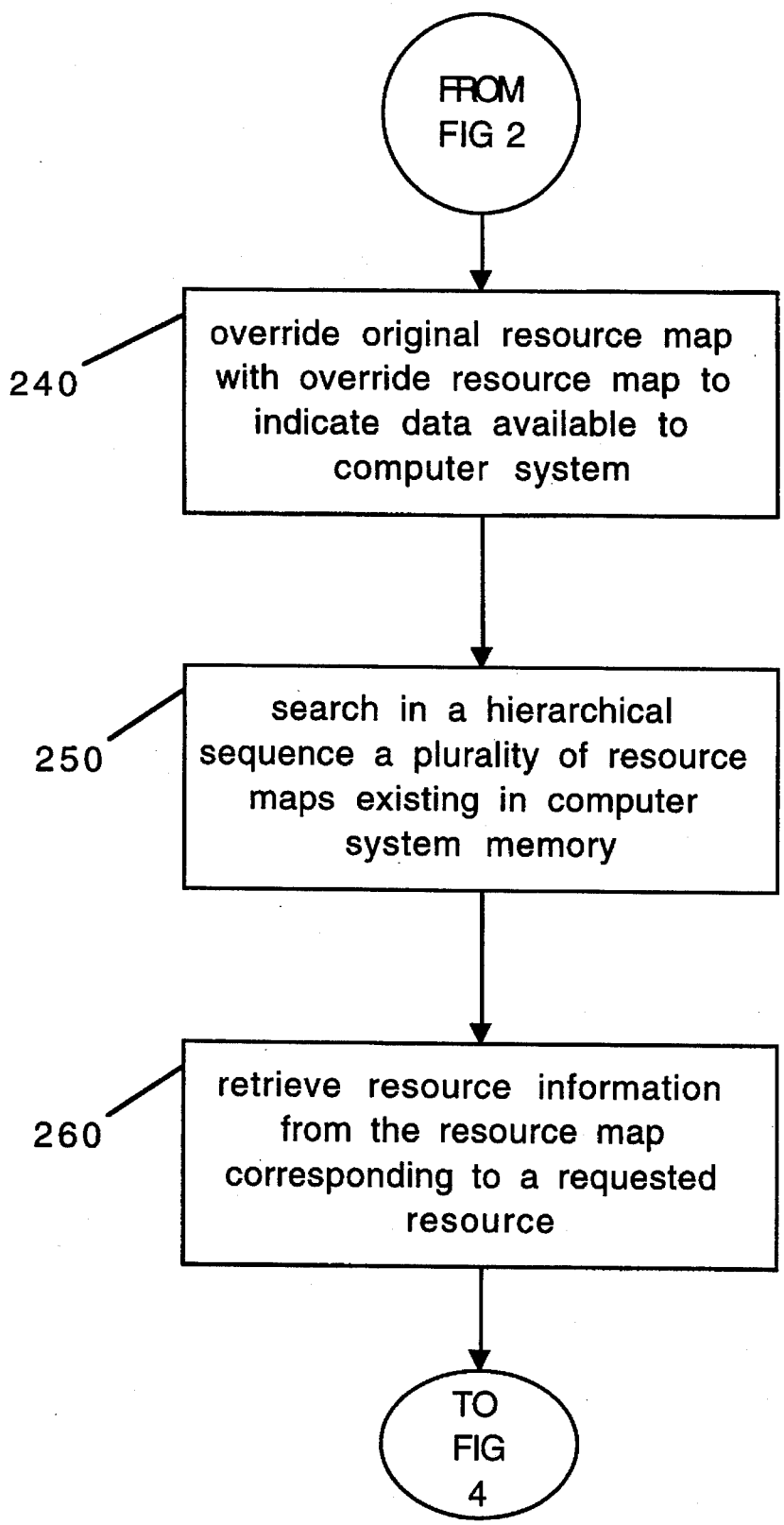

Referring now to FIG. 3, the next function executed in the preferred embodiment is overriding the original resource map with the override resource map to indicate data available in the computer system 240. The next function executed in the preferred embodiment is the hierarchical search of a plurality of resource maps existing in the computer system memory 250. The next function executed in the preferred embodiment is retrieval of resource information corresponding to a requested resource from the resource map 260.

Figure 4:
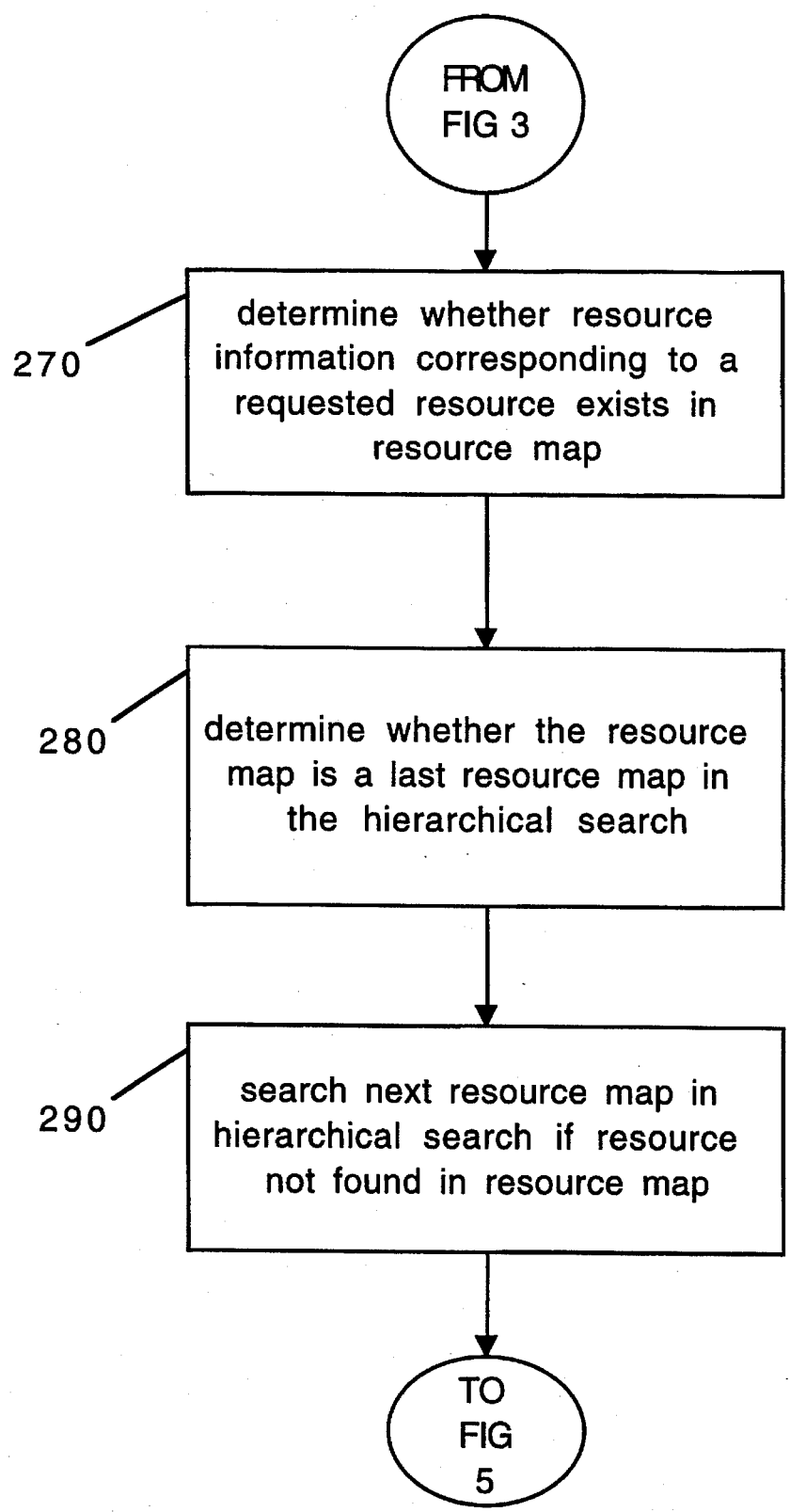

Referring now to FIG. 4, the next function executed in the preferred embodiment is to determine whether the resource information corresponding to a requested resource exists in the resource map 270. If the requested resource is found, the resource information is retrieved 260 and an indication generated that the resource was found and that resources found in the second resource map should be ignored 320. If the resource is not found the next function performed is to determine whether the resource map is the last resource map available in the resource chain 280. If there is not another resource map available in the resource chain the next function executed is to return a NIL value 300.

If another resource map is available, a function generates an indication that the next available resource map should be searched as part of the first resource map 310. If there is another resource map available it is searched for the requested resource 290.

Figure 5:
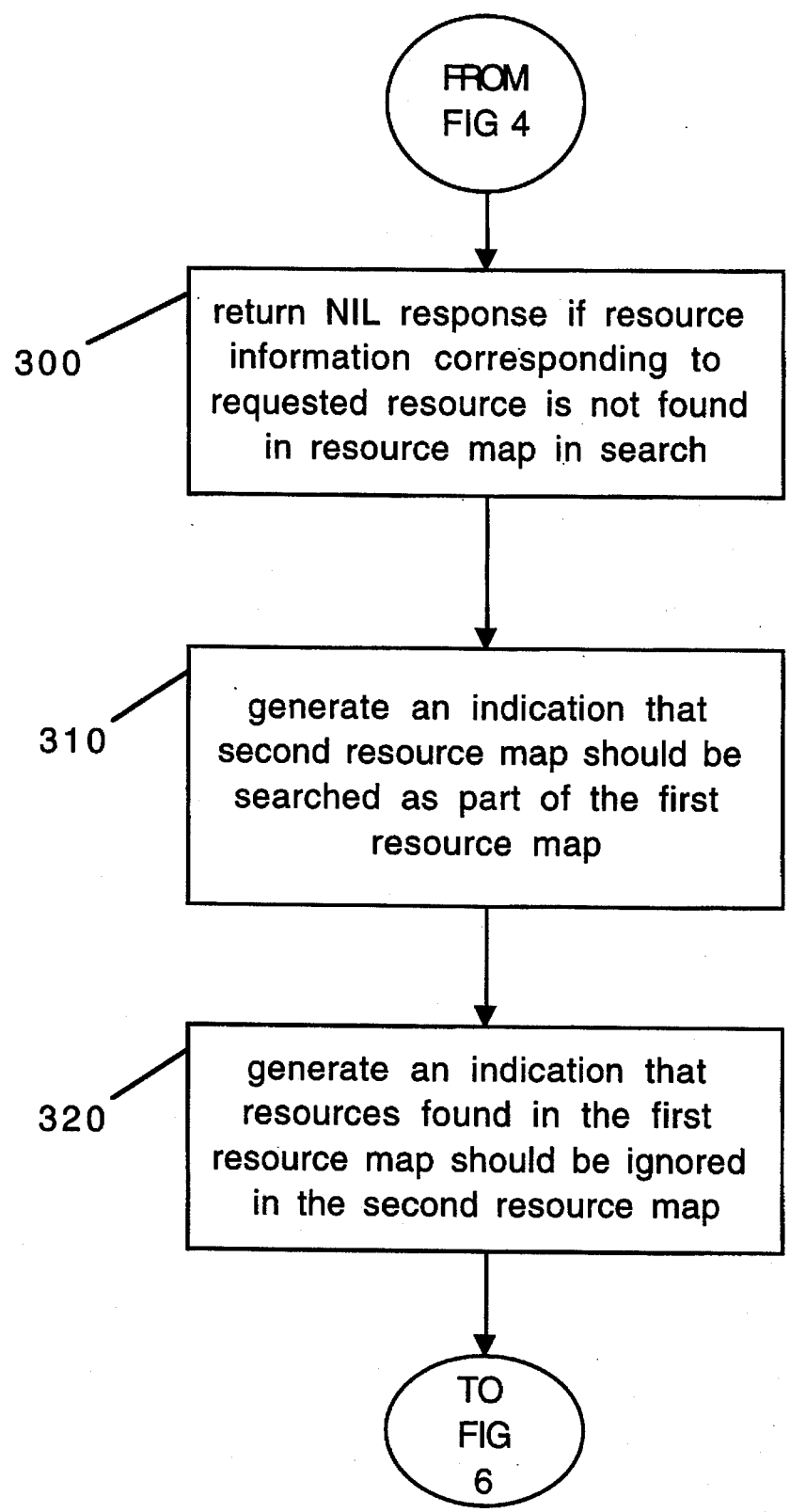

Referring now to FIG. 5, the next function executed in the preferred embodiment is to return a NIL response if the resource information corresponding to the requested resource is not found in the resource map 300. The next function executed in the preferred embodiment is generation of an indication that resources found in the first resource map should be ignored in the second resource map 320.

Figure 6:
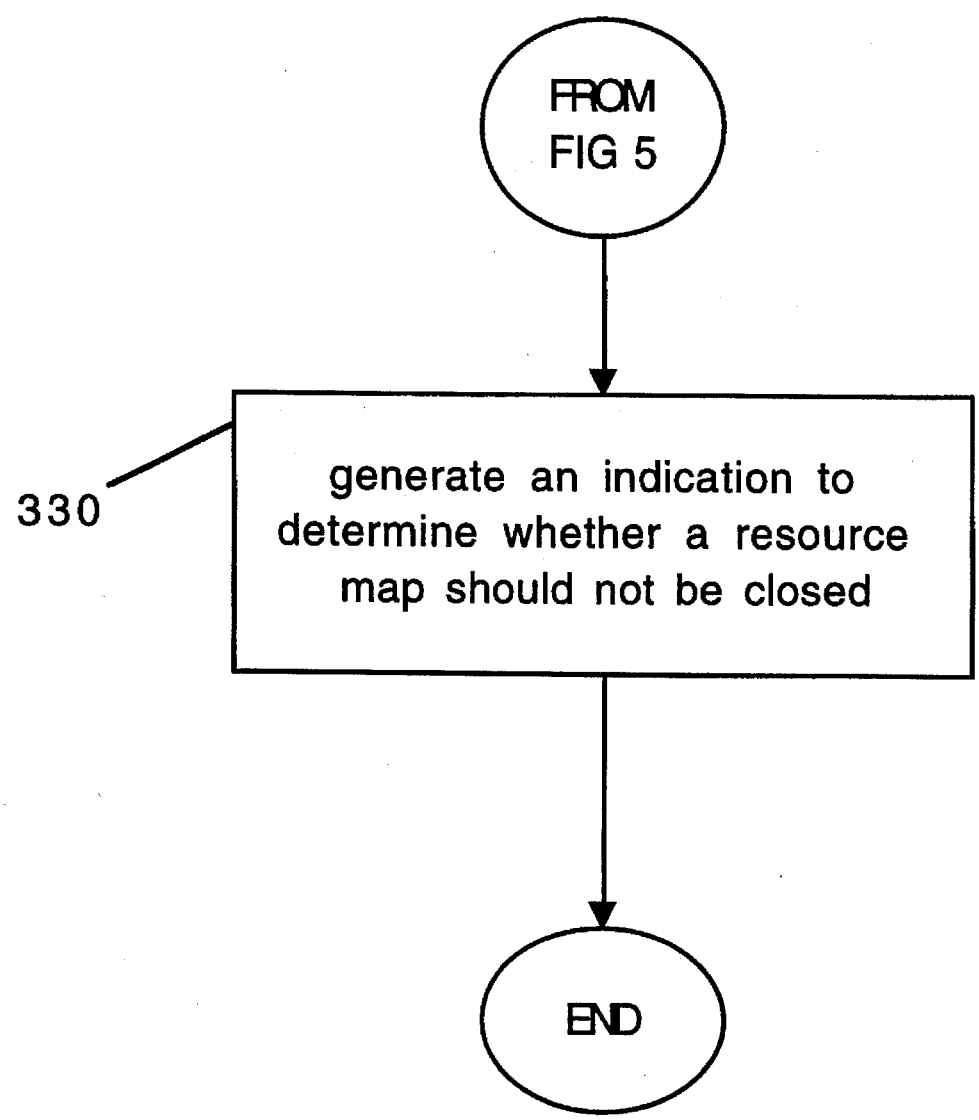

Referring now to FIG. 6, the last function executed in the preferred embodiment is generation of an indication to determine whether a resource map should not be closed 330.

In the preferred embodiment, bit-mapped font files and TrueType™ font files are kept in a Fonts Folder found in the System folder, opened at startup time, and made available for use. Preferably, resource maps for these files are kept in the system resource chain underneath the system resource map. Thus these files are always active unless expressly closed. In the preferred embodiment, the Two Deep behavior ensures that these additional font files underneath the system resource map are searched when a program requests a particular font.

In the preferred embodiment, a resource is described by a four-character resource type and an identification number. Thus, in the preferred embodiment, if an application desires a particular font, it calls for the font family type "FOND." The FOND type is a road map to a variety of font resources that are considered as one family. For example, in the preferred embodiment, the Courier font type face has a variety of different size type faces. The FOND resource ties all of these different sizes of Courier together to tell the font manager that these resources should be treated as one family. In the preferred embodiment, Courier fonts comprise a family. The FOND comprises the family descriptor which describes which fonts comprise the family. Preferably, each type face has its own FOND and family identifier within it. In the preferred embodiment, a number twenty-one, for example, represents the Courier font type face family. Preferably, other type faces such as Helvetica or Times are assigned different numbers.

In the preferred embodiment, in order to obtain the Courier font type face, the application program calls Get1Resource('FOND', 21). When the System resource map and the underlying font resource maps all have their kTwoDeepBits set, the Resource Manager will search the System file and the maps of the font files underneath the System file. Preferably, Get1Resource returns when a 'FOND' resource with an identification number of 21 is found, or when a resource map that does not have this kTwoDeepBit set is searched, thus ending the resource chain. In the latter case, upon reaching the end of the resource chain, if the resource has not been found, NIL is returned.

The Ignore Duplicates Behavior

In the preferred embodiment, an application may call GetIndResource with a given resource type, for example FOND, and an index N. Preferably, GetIndResource asks the Resource Manager to fetch the Nth resource of the resource type FOND encountered in the resource chain. In the preferred embodiment, a system enabler can replace a resource already in the system file. For example, FOND 21 may already exist in the system file. If the system designers later discover a mistake in the original FOND 21 as it exists in the system file, they may change FOND 21 by releasing a new system enabler file. Preferably, the system enabler corrects the problem by supplying a new FOND 21 in the system enabler's resource file. Thus, when an application calls for FOND 21, the override behavior ensures that the newer corrected version of FOND 21, provided by the system enabler, is returned instead of the older FOND 21 which exists in the system file.

Preferably, the application will not see the FOND 21 in the system file when a resource map has its IgnoreDuplicatesBit set. Thus, if there is a resource in this file that also exists in a resource override file, then assume that the FOND 21 in the system file does not exist. Thus, in the preferred embodiment, when a new FOND 21 is installed by a system enabler, it sets the IgnoreDuplicatesBit for the system file's resource map so that when an application calls GetIndResource and the index is identical to the index for the FOND in the system file, it will skip that resource map and go to the next resource map in the resource chain.

In the preferred embodiment, when a map contains a resource whose type and identification number are identical to those of another resource located in a resource map placed higher in the resource chain, both resources will be counted when CountResources or GetIndResource are called. Preferably, when the kDontCountOrIndexDuplicatesBit is set in a resource map, instances of a resource in a resource map will be skipped if a resource with the same type and ID has been encountered in an override map. In the preferred embodiment, duplicate resources in resource maps which are not overridden will still be counted.

Preferably, an application calls GetIndResource to determine all occurrences of the particular resource type. For example, an application may request all occurrences of all font families, to determine which FOND families are installed on a given machine. Thus, the Ignore Duplicates behavior is provided to prevent the application from seeing a font twice when calling GetIndexResource. This behavior prevents the application from seeing the resource in the system file that has been replaced.

In an example of the preferred embodiment, a font family may be split across several suitcase files: one for Helvetica plain, another for Helvetica bold, and a third for Helvetica italic. Preferably, each suitcase contains a 'FOND' resource for the fonts contained in that suitcase. In the preferred embodiment, CountResources counts each of the 'FOND' resources it encounters. If the kDontCountOrIndexDuplicatesBit is set in each suitcase resource map, however, only the first occurrence of the Helvetica 'FOND'-Helvetica plain—will be counted. The Helvetica 'FOND' resources from the other two Helvetica files will be ignored. The 'FOND' in the current resource map would not be counted if the current resource map has this bit set.

Preferably, a call to InsertOverrideMap will set the kDontCountOrIndexDuplicatesBit in the resource map that is to be overridden, which also sets the MapOverride bit and the twoDeepbit on the new override map. Preferably, if override resources are supplied, the original overridden resource will not be found programmatically by calling CountResources or GetIndResource.

The Protect From Close Behavior

In the preferred embodiment, when an application terminates, the system software will automatically close all files associated with the application. There are also programs that allow the user to look at resources for other files. Thus if the user closes the file while he is looking at one of the fonts in the fonts folder, this will cause the font file to be closed which may be in use by other applications. Thus the Protect from close behavior identifies a file as a protected system file and prevents it from being inadvertently closed.

In the preferred embodiment, certain files, such as system enabler files or CPU Gibbly resource files and Fonts Folder resource files should not be closed during the normal operation of the computer system. If the current version of the resource editor program ResEdit, in the preferred embodiment, is not aware of the resource override behaviors, the resource editor may attempt to close files that should remain open, such as the CPU Gibbly resource files or Fonts Folder resource files.

Preferably, to prevent resource files from being accidentally closed, the preventFileFromBeingClosedbit is set in the resource maps of their files. Preferably, any resource map with the preventFileFromBeingClosedbit set in its resource map cannot be closed when CloseResFile is called with the file's reference number.

Combining Resource Override Behaviors

In the preferred embodiment, more than one resource override behavior can be applied to any resource map. Preferably, this is accomplished by utilizing a combination of the four bits. For example, a CPU Gibbly may have its overrrideNextMap, twoDeep, and preventFileFromBeingClosed bits set, while the resource maps for the fonts from the Fonts Folder will not have the overrideNextMapBit set.

Resource Override Routines

In the preferred embodiment, the software routines help to enable computer programs to manipulate resource override behaviors. In the preferred embodiment, a system enabler can be located in its own separate file or it can be located in ROM. Preferably, the ROM resource map is normally not in the resource chain. Thus, a function is provided to enable a system enabler in ROM to create an override map for the system file from resources that are in ROM and place the override map in the resource chain. Preferably, ROM resources are not normally looked up unless a specific request is made for a ROM resource. The system may select resources from the ROM resource map to be placed in the override resource map so that these resources can override the system resource in the system file. In the preferred embodiment, this functionality is provided by the procedure MakeOverrideMap.

In the preferred embodiment MakeOverrideMap creates a new resource override map from the ROM resource map. Preferably, the resources that are to be added to this override map are specified in the 'rovm' resource. The newly created override map is placed in the resource chain above the resource map specified in the mapToOverride parameter. Resource references that are added to the override map are removed from the ROM resource map. In the preferred embodiment, this call is used by ROM based CPU Gibblies to override resources in the System file with newer versions in ROM. This procedure is called as follows: Procedure MakeOverrideMap(mapToOverride: Handle).

In the preferred embodiment, a similar functionality is provided for a file based system enabler rather than a ROM enabler file. This functionality is provided by a procedure named InsertOverrideMap. This procedure is called as follows: InsertOverrideMap(overrideMap, mapToOverride: Handle). In the preferred embodiment, when given a handle to a resource map in the overrideMap parameter, InsertOverrideMap places the resource map above mapToOverride in the resource chain. Preferably, this resource map will subsequently be treated as an override map by the Resource Manager. In the preferred embodiment, there may be more than one override map for any resource map. Preferably, software based CPU Gibblies should call InsertOverrideMap if it has newer versions of resources contained in the base system. Preferably, InsertOverrideMap sets the overrideNextMap, twoDeep, and preventFileFromBeingClosed bits on overrideMap, and the dontCountOrIndexDuplicatesBit on the map specified by mapToOverride.

In the preferred embodiment, functionality is provided so that given a handle, the resource map can be examined utilizing this handle in case a system enabler has overridden resources. This function is called as follows: Function GetOverrideMap(resourceMap: Handle): In the preferred embodiment, GetOverrideMap returns a handle to the resource override map for the given resource map. Preferably, if the resource map does not have an override map, the handle to the original resource map is returned. In the preferred embodiment, if a resource map has more than one override map, a handle to the topmost override map in the resource chain is returned. Preferably, programs that manipulate the resource chain directly call GetOverrideMap to ensure that the resource override maps will not be removed from the resource chain.

In the preferred embodiment, the GetOverrideAttributes functionality is provided to determine the current behavior of a particular map. This function is useful to fetch and store a map's behavior attributes so that they can be restored after manipulation of the attributes by program control. This function is called as follows: Function GetOverrideAttributes(resourceMap: Handle): SignedByte. In the preferred embodiment, GetOverrideAttributes returns a value that describes what resource override behaviors a resource map exhibits, if any.

In the preferred embodiment, functionality is provided that enables a program to turn off the override behavior. For example, to look at only the system file for a particular resource without looking at all of the font files underneath the system file, the functionality of SetOverrideAttributes and GetOverrideAttributes is provided to selectively turn off the override behavior on the system. This routine is called as follows: Procedure SetOverrideAttributes(resourceMap: Handle; attributes:SignedByte). In the preferred embodiment, calling SetOverrideAttributes for a resource map will replace override behaviors the map currently exhibits with the behaviors specified by the attributes parameter.

In the preferred embodiment, a global switch is provided to indicate whether or not the override attributes will be recognized by the system. The procedure called as follows provides this functionality: SetScanOverride(scanOverrideMaps: Boolean). In the preferred embodiment, all override behaviors can be turned on and off by calling SetScanOverride. Preferably a program designed to get the original resource and not an override resource should call SetScanOverride(False). Programs that call SetScanOverrided(False) preferably should call SetScanOverride(True) as soon as possible after this.

In the preferred embodiment, resources from a system file, system enablers, and font files should always load into the system heap and preferably not into an application's heap. Preferably, a functionality is provided to determine whether a resource from a given resource map should be loaded into the system heap or an application heap. In the preferred embodiment, this functionality is provided by IsThisASystemResourceMap called as follows: Function IsThisASystemResourceMap(resourceMap: Handle): Boolean. Resources from the system resource map are loaded into the system heap. In the preferred embodiment, because CPU Gibblies may override the system resource map, seeing if a resource is in the resource map handle stored in SysMapHndl is no longer a valid check. Preferably, if a program determines resources from a particular resource map should be treated as system resources, it should pass the resource map handle to IsThisASystemResourceMap. In the preferred embodiment, this routine will return "true" if resources from this map should be treated as system resources, and "false" otherwise.

In the preferred embodiment, functionality is provided to open a resource file underneath the system file in the resource chain in the linked list. Preferably this functionality is provided by OpenResFileUnderSystemMap called as follows: Function OpenResFileUnderSystemMap(fileSpec: FSSpecPtr): Integer. In the preferred embodiment OpenResFileUnderSystemMap will open a resource file and place its resource map underneath the system resource map in the resource chain. Preferably, this makes the resources in this map available to all processes. In the preferred embodiment, files opened with this call will be searched for resources if the resources are not found in the system resource map when a program calls GetResource, Get1Resource, GetIndResource, or Get1IxResource. Preferably, to maintain this behavior, programs that wish to place files below the system resource map use OpenResFileUnderSystemMap, or manually place the file at the end of the resource chain. In the preferred embodiment, if the file described by the file specification record is successfully opened, a file reference number will be returned, and if the file could not be opened for any reason, −1 will be returned.

While a preferred embodiment has been shown, it is not intended to be a limitation of the scope of the claims. It is expected that a person of skill in the art could take this specification and alter the specific embodiment but still be within the intended scope of the claims.

Having thus described our invention, what we claim as new, and desire to secure by Letters Patent is:

1. A method for modifying a computer system to enable the computer system to accommodate new hardware by overriding an original resource map in the computer system, the method comprising the steps of:

loading an original resource map into a linked list during stamp initialization of the computer system, wherein the original resource map defines originally available system resources;

loading an override resource map into the top location of the linked list during stamp initialization of the computer system, the override resource map defining available system resources added to the computer system after the originally available resources;

comparing resource definitions of the original resource map and of the override resource map that define similar resources in order to identify which definitions of the original resource map are to be overridden by the override resource map;

identifying which definitions of the override resource map are to override similar respective definitions of the original resource map by setting a predetermined bit in each of the override map definitions; and overriding the similar respective definitions of the original resource map.

2. An apparatus for modifying a computer system to enable the computer system to accommodate new hardware by overriding an original resource map in the computer operating system, the apparatus comprising:

means for loading an original resource map into a linked list during stamp initialization of the computer system, wherein the original resource map defines originally available system resources;

means for loading an override resource map into the top location of the linked list during startup initialization of the computer system, the override resource map defining available system resources added to the computer system after installation of the originally available resources;

means for comparing resource definitions of the original resource map and of the override resource map that define similar resources in order to identify which definitions of the original resource map are to be overridden by the override resource map;

means for identifying which definitions of the override resource map are to override similar respective definitions of the original resource map by setting a predetermined bit in each of the override map definitions; and means for overriding the similar respective definitions of the original resource map.

3. The method of claim 1, further comprising the step of:

indicating that a second override resource map is to be searched as part of the first resource map.

4. The method of claim 1, further comprising the step of:

searching for a requested resource map in a lower location of the linked list until the requested resource map is located.

5. A method for modifying a computer system to enable the computer system to accommodate new hardware by overriding an original resource map in the computer system, the method comprising the steps of:

loading an original resource map during stamp initialization of the computer system, wherein the original resource map defines originally available system resources;

loading an override resource map during startup initialization of the computer system, the override resource map defining available system resources added to the computer system after the originally available resources;

comparing resource definitions of the original resource map and of the override resource map that define similar resources in order to identify which definitions of the original resource map are to be overridden by the override resource map;

identifying which definitions of the override resource map are to override similar respective definitions of the original resource map by setting a predetermined bit in each of the override map definitions; and overriding the similar respective definitions of the original resource map.

6. The method defined in claim 5, wherein the computer system includes a resource chain, and the step of loading the override resource map comprises:

loading the override resource map in the resource chain.

7. The method defined in claim 6, wherein the override resource map and the original resource map are positioned at sequential locations in the resource chain.

8. The method defined claim 7, wherein the override resource map is positioned at a higher sequential location than the original resource map in the resource chain.

9. An apparatus for modifying a computer system to enable the computer system to accommodate new hardware by overriding an original resource map in the computer operating system, the apparatus comprising:

means for loading an original resource map during stamp initialization of the computer system, wherein the original resource map defines originally available system resources;

means for loading an override resource map during stamp initialization of the computer system, the override resource map defining available system resources added to the computer system after installation of the originally available resources;

means for comparing resource definitions of the original resource map and of the override resource map that define similar resources in order to identify which definitions of the original resource map are to be overridden by the override resource map;

means for identifying which definitions of the override resource map are to override similar respective definitions of the original resource map by setting a predetermined bit in each of the override map definitions; and means for overriding the similar respective definitions of the original resource map.

10. The apparatus defined in claim 9, further comprising:

a resource chain; and wherein the two means for loading a resource map load the respective resource map into the resource chain.

11. The apparatus defined in claim 10, wherein the override resource map and the original resource map are positioned at sequential locations in the resource chain.

12. The apparatus defined in defined claim 11, wherein the override resource map is positioned at a higher sequential location than the original resource map in the resource chain.

* * * * *